Patented July 3, 1951

2,558,786

UNITED STATES PATENT OFFICE 2,558,786

PREGNANE 20-CYANOHYDRINS

Lewis H. Sarett, Princeton, N. J., assignor to Merck & Co., Inc., Rahway, N. J., a corporation of New Jersey No Drawing. Application September 22, 1948, Serial No. 50,668, which is a division of application Serial No. 778,465, October 7, 1947. Divided and this application July 20, 1950, Serial No. 175,021

5 Claims. (Cl. 260—397.4)

1

This invention is concerned generally with novel steroid compounds and with processes for preparing them. More particularly, it relates to the preparation of $\Delta^{17}$-20-cyano-pregnene compounds from the corresponding 20-keto-pregnane compounds and to the intermediates utilized in preparing the same.

This application is a division of my co-pending application Serial No. 50,668, filed September 22, 1948, which in turn, is a division of my co-pending application Serial No. 778,465, filed October 7, 1947, now Patent No. 2,541,105, which, in turn, is a continuation-in-part of my co-pending application Serial No. 773,525, filed September 11, 1947, now Patent No. 2,541,104. The $\Delta^{17}$-20-cyano-pregnene compounds herein described can be converted to the corresponding 17($a$)-hydroxy-20-keto-pregnane compounds according to the procedure outlined on the following page and described in detail in said co-pending applications.

The ($a$)-hydroxy groupings in the compounds thus obtained, have the same stereochemical configuration as that present in many of the naturally-occurring adrenal hormones. This is of special interest in the preparation of pregnene-4-diol-17($a$),21-trione-3,11,20 (commonly known as Kendall's Compound E), and its 21-acyl derivatives. These compounds are important as adrenal hormones or in therapy requiring adrenal hormone type compounds. They are further useful in the synthesis of similar hormones and compounds.

According to the present invention, 20-keto-pregnane compounds are treated with hydrogen cyanide or one of its salts to produce the corresponding 20-hydroxy-20-cyano-pregnane compound. This product is reacted with a dehydrating agent to produce the corresponding $\Delta^{17}$-20-cyano-pregnene, which is then reacted with an oxidizing agent and the intermediate product hydrolyzed to produce the coresponding 17($a$)-hydroxy-20-keto-pregnane compound. The 17-hydroxy group, introduced according to this novel method, is obtained, surprisingly enough, in only one isomeric form, namely the $a$ or "natural" configuration.

These reactions may be chemically represented in the case of 20-keto-pregnane as follows:

2

For purposes of this application the configuration represented by the notation 17($a$)-hydroxy is to be understood to represent the configuration present in the naturally-occurring adrenal compounds.

The preferred class of starting materials utilized in practicing the present invention are 20-keto-pregnanes which contain free of esterified hydroxyl groupings in the molecule, and which may also contain keto groupings. These preferred starting materials may be represented by the following generic formula:

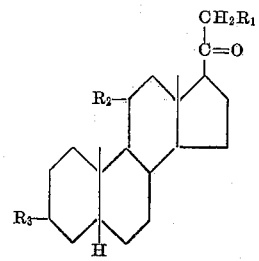

wherein $R_1$ and $R_3$ are radicals selected from the class which consists of hydroxy radicals, acyloxy radicals and hydrogen and $R_2$ is a radical selected from the class which consists of keto radicals and hydrogen.

Examples of this preferred class of starting materials are: 3($a$)-hydroxy-11,20-diketo-pregnane, 3-acetoxy-11,20-diketo-pregnane, 3-benzoxy-11,20-diketo-pregnane, 3($a$)-hydroxy-11,20-diketo-21-hydroxy-pregnane, 3($a$)-hydroxy-11,20-diketo-21-acetoxy-pregnane, 3($a$),21-diacetoxy-11,20-diketo-pregnane, and the like.

In carrying out my improved process, I ordinarily react a starting material of the above class with hydrogen cyanide, or one of its salts, preferably in solution in a lower aliphatic alcohol. When the resulting C-20 cyanhydrin contains free primary or secondary hydroxyl groupings, these may be protected, prior to the dehydration reaction, by conversion to the corresponding acyloxy radicals. This is accomplished by reacting said cyanhydrin with an acylating agent, such as a lower aliphatic acid anhydride. Alternatively, a secondary hydroxyl group may be protected by oxidation to a ketone, since the C-20-

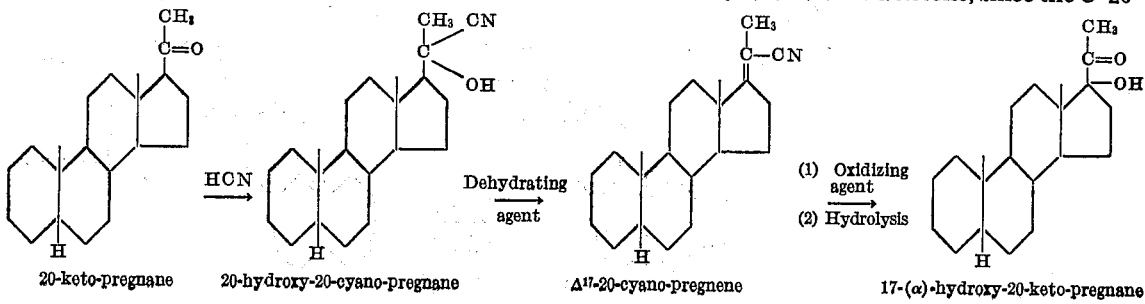

cyanhydrin grouping is stable to this treatment. It is ordinarily preferred to conduct this oxidation reaction utilizing chromic acid as the oxidizing agent.

The dehydration reaction is best carried out by treating the cyanhydrin, after acylation or oxidation of any free hydroxyl groupings which may be present, with a dehydrating agent, such as phosphorus oxychloride. This reaction is ordinarily carried out in solution in a substantially anhydrous organic solvent, such as pyridine.

Moreover, the 20-hydroxy-20-cyano-pregnane compounds are stable to oxidizing agents. This unexpected property makes it possible to react 3,20-dihydroxy-20-cyano - pregnane compounds with oxidizing agents, such as chromic acid, to produce directly the corresponding 3-keto-20-hydroxy-20-cyano-pregnane compound.

The following examples illustrate methods of carrying out the present invention, but it is to be understood that these examples are given by way of illustration and not of limitation.

sium cyanide. The solution is allowed to warm to room temperature and after three hours is diluted with water and filtered. The wet crude cyanhydrin is dissolved in ethyl acetate and the extract washed with water. Crystallization then gives approximately 1.5 g. of 3($\alpha$),20-dihydroxy-20-cyano-11-keto-pregnane (Compound 2).

To a solution of 1.4 g. of 3($\alpha$),20-dihydroxy-20-cyano-11-keto-pregnane in 70 cc. of acetic acid is added at 16° C. a solution of 0.9 g. of chromic acid in 7 cc. of acetic acid. At the end of one hour, water is added, the crystalline precipitate filtered and recrystallized from ethyl acetate to produce approximately 0.93 g. of 3,11-diketo-20-hydroxy-20-cyano - pregnane (Compound 3), dec. 170–180° C.

About 0.60 cc. of phosphorus oxychloride is added to a solution containing 2.0 g. of 3,11-diketo-20-hydroxy-20-cyano - pregnane dissolved in 6.7 cc. of pyridine. After standing at room temperature for 24 hours, the solution is poured into water and dilute hydrochloric acid, extracted

*Example 1*

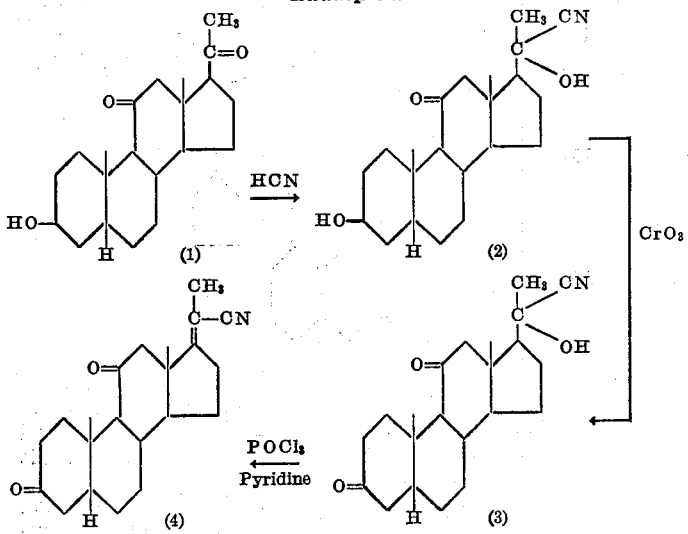

A solution of 1.80 g. of 3($\alpha$)-hydroxy-11,20-diketo-pregnane (Compound 1, preceding), which can be prepared as described by Von Euw, Lardon and Reichstein in Helv. Chim. Acta 27, 821 (1944), in a mixture of 25 cc. of alcohol and 6.4 cc. of acetic acid at 0° C. is treated with 6.0 g. of potaswith benzene and concentrated to dryness. The crystalline residue consists of nitriles which may be separated chromatographically to produce approximately 300 mg. of $\Delta^{17}$ - 3,11 - diketo-20 - cyano - pregnene (Compound 4); M. P. 222–223° C.

*Example 2*

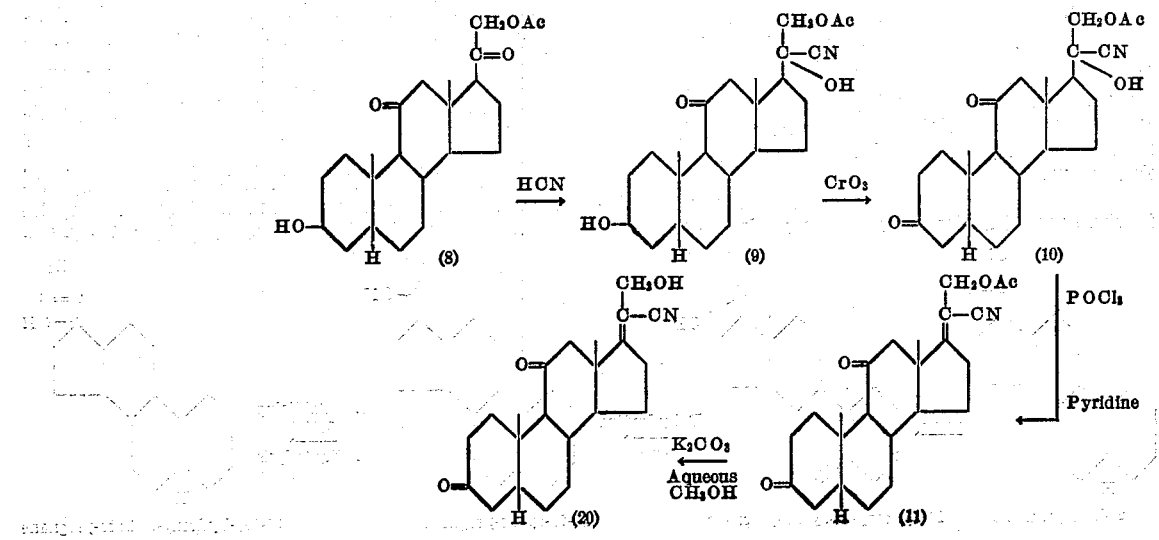

A solution of 2.0 g. of 3(α)-hydroxy-21-acetoxy-11,20-diketo-pregnane (Compound 8), which can be prepared as described by Von Euw, Lardon and Reichstein, Helv. Chim. Acta 27, 1287 (1944), is treated in a mixture of 25 cc. of alcohol and 6.4 cc. of acetic acid at 0° C. with 6.0 g. of potassium cyanide. The solution is allowed to warm to room temperature and after 3 hours is diluted with water. The addition of a large volume of water to the alcohol-hydrogen cyanide mixture precipitates a gun which is extracted with chloroform or ethyl acetate. The extract is washed with water, and evaporated to small volume under reduced pressure. The crystalline precipitate (1.3 g.) consists of 3(α),20-dihydroxy-20-cyano-21-acetoxy-11-keto - pregnane (Compound 9); dec. 175–185° C.

A solution of 0.60 g. of chromic acid in 1.2 cc. of water and 11 cc. of acetic acid is added to a solution containing about 1.2 g. of 3(α),20-dihydroxy-20-cyano-21-acetoxy-11-keto-pregnane at room temperature. After 1 hour, water is added and the product which precipitates, is filtered and recrystallized from ethyl acetate to produce 3,11-diketo-20-hydroxy-20-cyano - 21 - acetoxypregnane (Compound 10); dec. 214–217° C.

0.40 cc. of phosphorus oxychloride is added to a solution containing about 950 mg. of 3,11-diketo-20-hydroxy-20-cyano-21-acetoxy- pregnane dissolved in 3 cc. of pyridine. After standing at room temperature for 24 hours, the solution is poured into water and dilute hydrochloric acid, extracted with benzene and concentrated to dryness. The crude product, after chromatography gives one main constituent, namely $\Delta^{17}$-3,11-diketo-20-cyano - 21 - acetoxy - pregnene (Compound 11); M. P. 189–190° C.

This compound is further identified by hydrolysis to the corresponding 21-hydroxy derivative, without affecting the cyano grouping. About 150 mg. of the $\Delta^{17}$-3,11-diketo-20-cyano-21-acetoxy-pregnene (Compound 11) is dissolved in 5 cc. of methanol, and a solution containing 200 mg. of potassium carbonate in 2 cc. of water added thereto. The resulting solution is maintained at approximately 50° C. for fifteen minutes, the methanol is evaporated in vacuo, and the crystalline product, which precipitates, recovered by filtration. Recrystallization of this material from ethyl acetate gives substantially pure $\Delta^{17}$-3,11-diketo-20-cyano-21-hydroxy - pregnene (Compound 20); M. P. 263–265° C.

*Example 3*

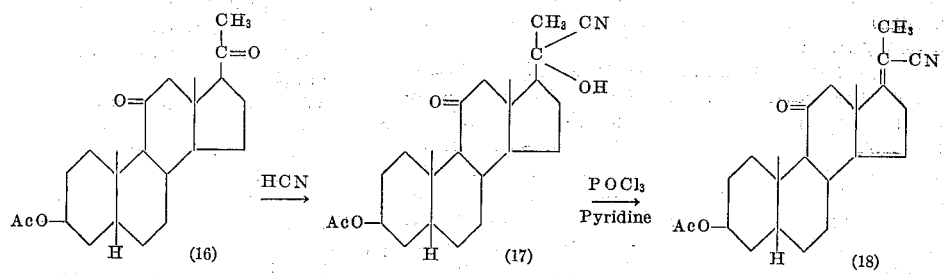

About 1.70 g. of 3(α)-acetoxy-11,20-diketopregnane (Compound 16) which can be prepared as shown by Von Euw, Lardon and Reichstein in Helv. Chim. Acta 27, 821 (1944) is dissolved in a mixture of 25 cc. of alcohol and 6.4 cc. of acetic acid and the solution is treated at 0° C. with 6.0 g. of potassium cyanide. The solution is allowed to warm to room temperature and after three hours is diluted with water and the material which precipitates recovered by filtration. The 3(α)-acetoxy-20-hydroxy - 20 - cyano - 11 - keto-pregnane (Compound 17), thus obtained may be purified by recrystallization from ethyl acetate. It decomposes at about 221–223° C. Yield approximately 90% of theory.

To a solution of 293 mg. of 3(α)-acetoxy-20-hydroxy-20-cyano-11-keto-pregnane in 1.0 cc. of dry pyridine is added 0.10 cc. of phosphorus oxychloride. After standing at room temperature for 24 hours, the solution is poured into water and dilute hydrochloric acid, extracted with benzene and the benzene extract concentrated to dryness. The crystalline residue consists of a mixture of unsaturated nitriles which may be separated chromatographically to produce $\Delta^{17}$-3(α)-acetoxy-11-keto-20-cyano-pregnene (Compound 18); M. P. 194–195° C.

*Example 4*

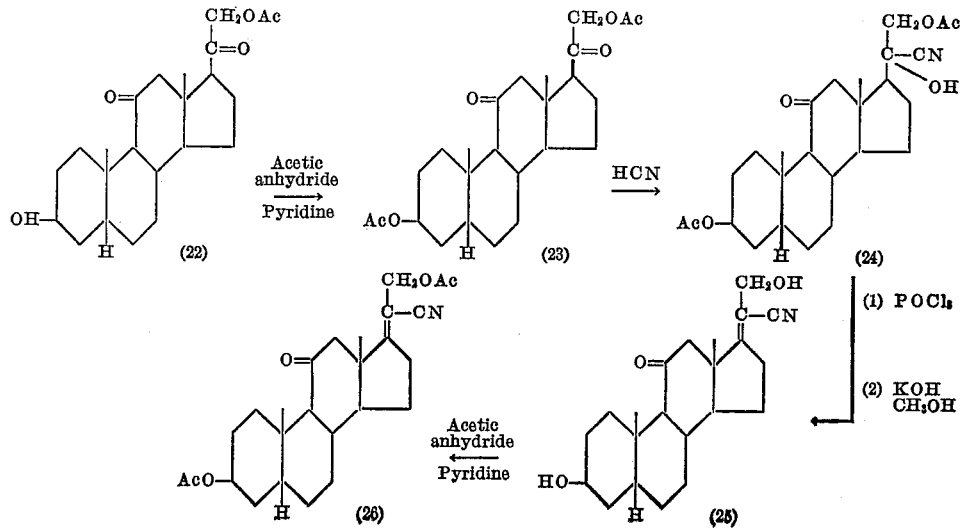

3(a) - hydroxy-11,20-diketo-21-acetoxy - pregnane (Compound 22) is treated with excess pyridine-acetic anhydride and the mixture warmed on the steam bath for approximately 10 minutes. The resulting solution is diluted with water and extracted with ether. The ethereal extract is washed with dilute hydrochloric acid, dilute sodium carbonate, and finally with water. The ether extract is then evaporated to small volume, and petroleum ether is added thereto to produce crystals of 3(a),21-diacetoxy-11,20-diketo-pregnane (Compound 23); M. P. 100–110° C., which contain 10% of solvent of crystallization. Recrystallization of this material from benzene-petroleum ether gives a product having a dec. point of 82–90° C.

About 3.0 g. of said 3(a),21-diacetoxy-11,20-diketo-pregnane is dissolved in a mixture of 30 cc. of alcohol and 11.4 cc. of acetic acid, and the resulting solution is cooled to 0° C. and treated with about 10.6 g. of potassium cyanide. The mixture is stirred for about one-half hour, and then permitted to warm to room temperature. After two hours, the solution is diluted with water, and the crystalline precipitate thus obtained is filtered and washed. The wet cake is dissolved in ethyl acetate, excess water removed and the solution is evaporated to small volume in vacuo. Petroleum ether is added to the resulting solution thereby precipitating crystalline 3(a),21-diacetoxy-11-keto-20-hydroxy-20-cyano-pregnane (Compound 24); M. P. 148–160° C. with dec.

To a solution of about 2.2 g. of 3(a),21-diacetoxy-11-keto-20-hydroxy-20-cyano-pregnane in about 8 cc. of dry pyridine is added approximately 1.2 cc. of phosphorus oxychloride. After standing at room temperature for 24 hours, the reaction solution is poured into water and dilute hydrochloric acid. The resulting aqueous mixture is extracted with benzene and the benzene extract is evaporated to produce approximately 2.0 g. of an oil. This oil is subjected to chromatographic separation and the portions which are eluted, employing petroleum ether-ether mixtures, are combined to produce approximately 1.84 g. of crude $\Delta^{17}$-3(a),21-diacetoxy-11-keto-20-cyano-pregnene which is obtained as an oil.

This oil is saponified by dissolving in a mixture of 10 cc. of benzene and 10 cc. of 1.1 N methanolic potassium hydroxide. After 10 minutes the solution is acidified with acetic acid, the benzene is evaporated in vacuo, and the residual material crystallized from dilute methanol to produce 1.45 g. of crude product; M. P. 242–254° C. This material is further purified by recrystallization from acetone and from dilute alcohol to produce substantially pure $\Delta^{17}$-3(a),21-dihydroxy-11-keto-20-cyano-pregnene (Compound 25); M. P. 256–257° C.

This product is treated with excess acetic anhydride and pyridine, at room temperature, to produce substantially pure $\Delta^{17}$-3(a),21-diacetoxy-11-keto-20-cyano-pregnene (Compound 26).

Various changes and modifications may be made in my invention as described without departing from the spirit and scope thereof. To the extent that these changes and modifications are within the purview of the annexed claims, they are to be considered as part of my invention.

I claim:

1. Pregnane compounds having both a cyano and a hydroxy substituent attached to the C-20 carbon atom.
2. 3(a)-acetoxy-20-hydroxy-20-cyano-11-keto-pregnane.
3. 3(a),21-diacetoxy - 11 - keto-20-hydroxy-20-cyano-pregnane.
4. 3-hydroxy-11-keto - 20 - hydroxy-20-cyano-21-acetoxy-pregnane.
5. 3,11-diketo-20-hydroxy - 20 - cyano-21-acetoxy-pregnane.

LEWIS H. SARETT.

REFERENCES CITED

The following references are of record in the file of this patent:

UNITED STATES PATENTS

| Number | Name | Date |
|---|---|---|
| 2,143,453 | Ruzicka | Jan. 10, 1939 |
| 2,150,885 | Schoeller | Mar. 14, 1939 |